Sept. 10, 1968          M. R. MACKLIN          3,401,100
ELECTROLYTIC PROCESS FOR CONCENTRATING CARBON DIOXIDE
Filed May 26, 1964
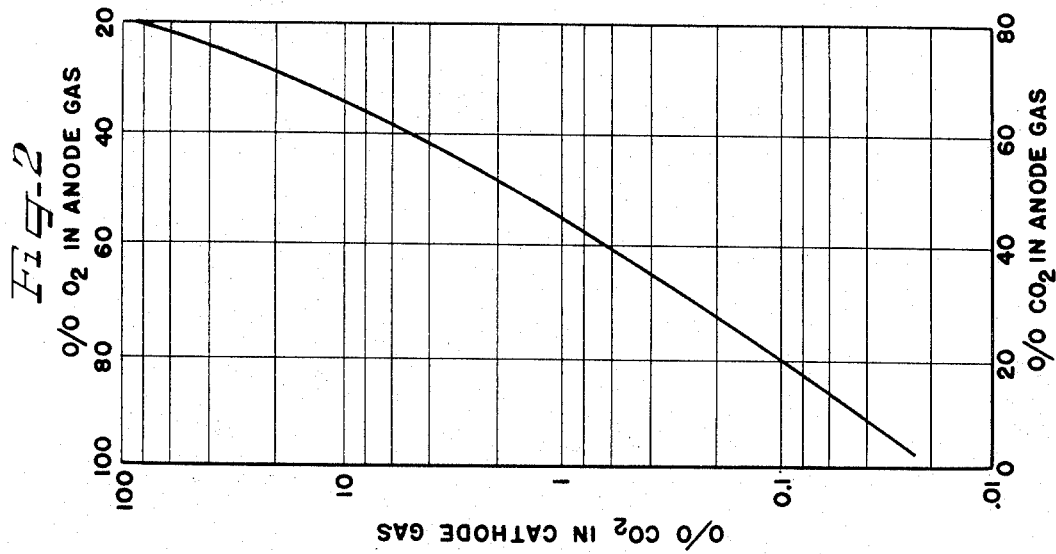
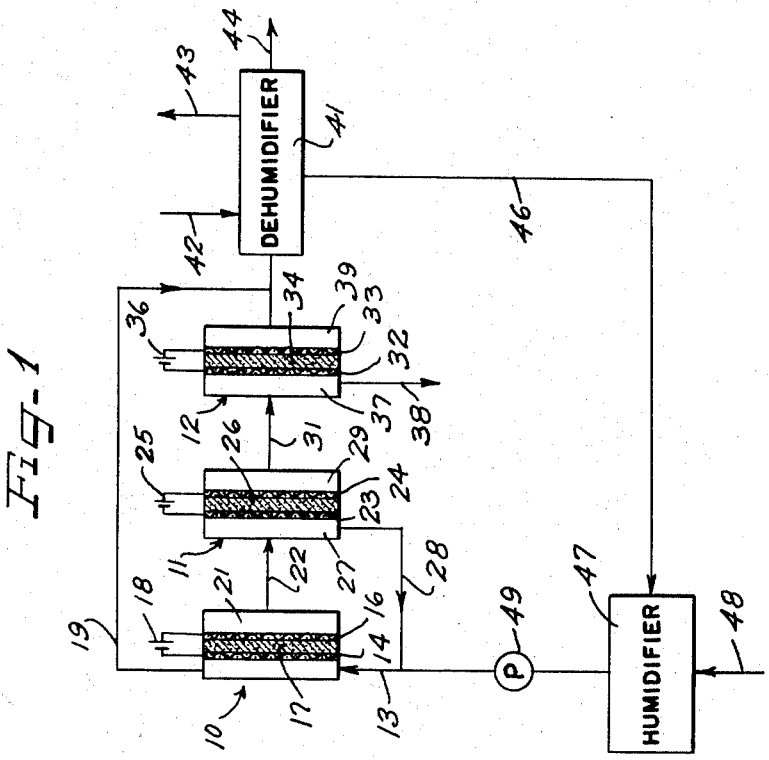
INVENTOR.
Martin R. Macklin
BY                           ATTORNEYS United States Patent Office 3,401,100
Patented Sept. 10, 1968

3,401,100
ELECTROLYTIC PROCESS FOR CONCENTRATING CARBON DIOXIDE
Martin R. Macklin, Cleveland, Ohio, assignor to TRW Inc., a corporation of Ohio
Filed May 26, 1964, Ser. No. 370,209
7 Claims. (Cl. 204—103)

The present invention relates to an improved method and apparatus for concentrating carbon dioxide from admixture with nitrogen and oxygen. The present invention is particularly applicable to oxygen generating systems for space craft and the like where it is desirable to collect the carbon dioxide generated by respiration and convert it to oxygen. It should be recognized, however, that the present invention is broadly applicable to any system in which it is desired to concentrate carbon dioxide from admixture with oxygen.

One of the objects of the present invention is to provide an improved electro-chemical method for separating carbon dioxide from admixture with oxygen, which method is particularly applicable at very low partial pressures of carbon dioxide.

Another object of the invention is to provide a method for separating carbon dioxide from air then concentrating it into a gaseous fraction which can then be passed to a carbon dioxide reduction stage for the recovery of oxygen therefrom.

A further object of the invention is to provide an improved method for recovering a carbon dioxide rich fraction from air efficiently.

A further object of the invention is to provide an apparatus for the separation of carbon dioxide from admixture with oxygen or mixtures of oxygen and nitrogen, the apparatus being compact and lightweight.

Another object of the invention is to provide an apparatus for the separation of carbon dioxide from admixture with oxygen, which apparatus is considerably more efficient, particularly at low carbon dioxide concentrations, than systems presently in use for this purpose.

Basically, the method of the present invention consists in passing the gaseous mixture containing carbon dioxide to the cathode of a concentration cell having an electrolyte therein permitting the passage of carbonate ions and oxygen (in the form of hydroxide ions) while preventing the passage of other gases such as nitrogen. A carbon dioxide enriched mixture is recovered at the anode of this cell, and this mixture may be passed through succeeding stages of concentration cells until a highly enriched carbon dioxide-oxygen mixture is recovered. Then, this mixture is passed to a concentration cell having an acid electrolyte which permits the passage of oxygen contained in the mixture, but prevents the passage of carbon dioxide therethrough. This final separation results in the production of a fraction having a high percentage of carbon dioxide, and useful as a feed to a carbon dioxide reduction unit. The oxygen which is separated in this manner is then dehumidified to remove the water vapor and may then be returned to the oxygen supply. The water vapor can then be recycled back to the first of the concentration cells in order to maintain the proper balance between ionizable salt and water in the electrolyte.

The preferred electrolyte for the first series of concentration cells is an aqueous solution of an alkali metal carbonate. Actually, the electrolyte may be an aqueous solution of either a carbonate or bicarbonate, since any aqueous solution will contain an equilibrium concentration of both. Sodium bicarbonate and lithium carbonate are comparatively insoluble, so that saturated solutions of these salts will normally be used. Potassium and cesium carbonate which are considerably more soluble, are employed as concentrated solutions, usually about 5 normal. Potassium carbonate is particularly preferred as the electrolyte since it has performance characteristics equal to the best obtained, and is considerably cheaper than cesium carbonate.

Concentration cells, per se, are not new in the art. They have been used for some time in the form of storage batteries and electrolytic cells. These cells are characterized by the existence of an ion concentration gradient in solution. The concentration cells of the present invention, termed carbonation cells, transfer ions formed from gas at one electrode and discharge the same gas at the opposite electrode. In the case of carbon dioxide concentration, carbon dioxide and oxygen are transferred from the cathode to the anode of a cell containing the alkali metal carbonate electrolyte.

In the operation of the carbonation cell, oxygen reacts with water and gains electrons to form hydroxyl ions. Dissolved carbon dioxide reacts with the hydroxyl ions to form carbonate or bicarbonate ions. These ions are transferred across the cell to the anode where electrons are removed and the ions are discharged as oxygen and carbon dioxide.

Three ion transfer mechanisms are important in the carbonation cell concentration system. Hydroxyl ions transfer oxygen from the cathode to the anode. Carbonate ions transfer carbon dioxide and oxygen in a two to one ratio. Bicarbonate ions transfer carbon dioxide and oxygen ions in a four to one ratio. All three of these transfer mechanisms appear to occur competitively in a carbonate electrolyte. The five reactions which are assumed to occur in a carbonate electrolyte are listed below—

Cathode:

$$O_2 + 2H_2O + 4e^- \rightarrow 4OH^-$$

Solution:

$$4CO_2 + 4OH^- \rightarrow 4HCO_3^-$$
$$2CO_2 + 4OH^- \rightarrow 2CO_3^{--} + 2H_2O$$

Anode:

$$4HCO_3^- \rightarrow 4CO_2 + O_2 + 2H_2O + 4e^-$$
$$2CO_3^{--} \rightarrow 2CO_2 + O_2 + 4e^-$$
$$4OH^- \rightarrow O_2 + 2H_2O + 4e^-$$

The electrolyte in the final concentration cell where the carbon dioxide is finally separated from the oxygen is preferably sulphuric acid, at a concentration of from 3 to 6 normal. In the acid cell, oxygen is transferred by a mechanism which differs from oxygen transfer in the carbonate cell. At the lower pH conditions existing in the acid cell, the following mechanisms are believed to be responsible for oxygen transfer—

Cathode:

$$O_2 + 4H^+ + 4e^- \rightarrow 2H_2O$$

Anode:

$$2H_2O \rightarrow O_2 + 4H^+ + 4e^-$$

A further description of the present invention will be made in conjunction with the attached drawings in which:

FIGURE 1 is a schematic diagram of one form of apparatus which can be used for the purposes of the present invention; and FIGURE 2 is a graph illustrating the variation in composition of the anode gas mixture of the carbonation cell as a function of the concentration of carbon dioxide in the cathode gas.

As shown in the drawings:

In FIGURE 1, there is illustrated a system in which two carbonate concentration cells are operated in series, and the effluent from the second cell is passed through an oxygen separating concentrator cell where the final separation is made. The two carbonator cells are identified at reference numerals 10 and 11 respectively, while the final concentration cell which separates the oxygen from the carbon dioxide is identified at reference numeral 12. The first concentrator cell, cell 10, is fed by means of an inlet line 13 with a mixture of carbon dioxide and oxygen or ordinary air containing carbon dioxide. The normal concentration of carbon dioxide in the air is about 0.03%. The carbonate concentration cell 10 may consist of a porous cathode 14 and a porous anode 16, the electrodes being composed of metals such as iron, nickel, or silver. Disposed between the cathode 14 and the anode 16 is an electrolyte 17 which may consist of a porous non-conducting matrix, normally asbestos, containing a concentrated solution of the alkali metal carbonate. A source of direct current potential 18 is connected across the cathode 14 and the anode 16. The potential of the cell 18 should be less than that required for the electrolysis of the electrolyte and consequent liberation of hydrogen and oxygen. Accordingly, the potential of the cell 18 is maintained at a value below about 1.5 volts.

At the cathode 14, the oxygen combines with the water of the electrolyte and with electrons to produce hydroxyl ions which pass through the electrolyte 17 and are attracted to the anode 16. The carbon dioxide reacts with the hydroxyl ions present to form both carbonate and bicarbonate ions which also migrate through the electrolyte 17 to the anode. The nitrogen, if any is present, remains completely inert to the system and may be vented off from the space adjoining the cathode 14 by means of a line 19.

At the anode 16, the bicarbonate ions are converted to carbon dioxide, oxygen, and water, while the carbonate ions are converted to carbon dioxide and oxygen. The hydroxyl ions reaching the anode are converted to molecular oxygen and water. The relative amounts of carbon dioxide and oxygen which appear in a space 21 behind the anode 16 depend upon the concentration of carbon dioxide in the gas mixture initially introduced to the cell. This will be evident from an inspection of FIGURE 2 which represents a graph of experimental results obtained in a carbonate concentration cell at various proportions of carbon dioxide and oxygen in the gas fed to the cathode of the cell. The cell had a potassium carbonate electrolyte. From the results obtained, it will be seen that the cell will concentrate a mixture of 4% carbon dioxide and 96% oxygen from atmospheric air. With a 0.5% carbon dioxide-air mixture at one atmosphere, the anode gas will contain 38% carbon dioxide and 62% oxygen.

The mixture of carbon dioxide and oxygen accumulated in the space 21 is passed by means of a line 22 to the second cell 11. The cell 11 includes a porous cathode 23, a porous anode 24, and an electrolyte 26 interposed therebetween. The cell is energized from a DC power source such as a battery 25. The construction of the cell 11 can be substantially identical to the structure of cell 10. The gaseous mixture is transferred between the cell 10 and the cell 11 strictly by the pressure generated by the cell 10 without mechanical pumping. The cathode of the second cell contains a higher concentration of carbon dioxide than the first cell, and consequently, the gas transferred by the second cell contains a higher concentration of carbon dioxide. The oxygen transferred by the first cell but not by the second cell is recycled from the cathode space 27 by means of a line 28 back into the first cell 10.

The mixture of carbon dioxide and oxygen, now highly concentrated in carbon dioxide, is collected in a space 29 behind the anode 24, and passes by means of a line 31 to the oxygen separator cell 12. The cell 12 includes a porous cathode 32, a porous anode 33, the electrodes being composed of metals such as iron, nickel, silver, and the like. An acid electrolyte 34 is interposed between the cathode 32 and the anode 33. A suitable source of DC potential such as a battery 36 applies a potential across the electrodes.

At the cathode of the cell 12, the oxygen gas combines with hydrogen ions and electrons to form water, and the water is broken down at the anode to release the oxygen gas. The carbon dioxide, in substantially pure form, cannot migrate through the cell 12 and is collected in a space 37 behind the cathode 32, where it can be removed from the cell by means of a line 38. This carbon dioxide may then be fed to a carbon dioxide reduction unit for the generation of oxygen.

The substantially pure oxygen is collected in a space 39 behind the anode 33, and is thereupon recombined with the nitrogen vented from the cell 10 by means of the line 19. The combined gases are then passed to a dehumidifier 41 which is cooled by a coolant circulated through an inlet line 42 and an outlet line 43. The dehumidifier preserves the cell water balance, the air of reduced humidity being discharged through a line 44, and the water being passed by means of a line 46 to a humidifier 47. Additional amounts of air are introduced into the humidifier 47 by means of a line 48, and a pump 49 then passes this mixture to the cell 10.

While the temperatures of cell operation can vary substantially it is desirable to operate the cells at temperatures on the order of 130° F. Actually, the upper limit of cell operation is the boiling point of the electrolyte involved. The lower limit of temperature will be determined by the current density required in the cell, as the current density decreases with temperature. Operation of a potassium carbonate cell at temperatures from 80 to 150° F. results in operation at current densities from about 20 to 40 amperes per square foot at a cell potential of about 1.4 volts.

Two carbonate cells of the type described were combined with a sulphuric acid cell for the removal of oxygen. Air containing its normal concentration of 0.03% carbon dioxide was introduced into the first cell, and the carbonation cells were operated at a temperature of about 125° F. The effluent from the first stage cell contained 4% carbon dioxide, and that of the second cell contained about 59% carbon dioxide. The effluent of the third cell was substantially pure carbon dioxide suitable for introduction into a carbon dioxide reduction unit.

The carbonation cells of the present invention have several advantages over other types of carbon dioxide separating systems. Carbonation cells require no cycling controls and no high temperature components. The only control necessary is associated with maintenance of the cell water balance. The carbonation cells are not complex mechanically, so that they are more reliable. In addition, the carbon dioxide concentrated by carbonation cells has oxygen as a contaminant, whereas effluents of other types of carbon dioxide separators contain nitrogen. The nitrogen gas builds up in a carbon dioxide reduction system, requiring purging to remove the inert gas.

It should be evident that various modifications can be made to the described embodiments without departing from the scope of the present invention.

I claim as my invention:

1. The method of concentrating carbon dioxide from admixture with nitrogen and oxygen which comprises passing the gaseous mixture to the cathode of a concentration cell having an ionizable carbonate compound-containing electrolyte therein permitting the passage of carbonate ions therethrough, collecting a carbon dioxide enriched mixture at the anode of said cell, passing said carbon dioxide enriched mixture to the cathode of a second concentration cell having an acid electrolyte permitting passage of the oxygen contained in said enriched mixture to the anode thereof, and collecting the carbon dioxide remaining at the cathode of said second concentration cell.

2. The method of concentrating carbon dioxide from admixture with nitrogen and oxygen which comprises passing the gaseous mixture to the cathode of a concentration cell having an aqueous alkali metal carbonate electrolyte, collecting a carbon dioxide enriched mixture at the anode of said cell, passing said carbon dioxide enriched mixture to the cathode of a second concentration cell having an acid electrolyte permitting passage of the oxygen contained in said enriched mixture to the anode thereof, and collecting the carbon dioxide remaining at the cathode of said second concentration cell.

3. The method of concentrating carbon dioxide from admixture with nitrogen and oxygen which comprises passing the gaseous mixture to the cathode of a concentration cell having an aqueous alkali metal carbonate electrolyte, collecting a carbon dioxide enriched mixture at the anode of said cell, passing said carbon dioxide enriched mixture to the cathode of a second concentration cell having a sulphuric acid electrolyte, and collecting the carbon dioxide remaining at the cathode of said second concentration cell.

4. The method of concentrating carbon dioxide from admixture with nitrogen and oxygen which comprises passing the gaseous mixture to a concentration cell having a porous cathode, a porous anode, and an aqueous alkali metal carbonate electrolyte therebetween, applying a potential between said cathode and anode less than the potential required to electrolyze said electrolyte, collecting a carbon dioxide enriched mixture at the anode of said cell, passing said carbon dioxide enriched mixture to the cathode of a second concentration cell having an acid electrolyte permitting passage of the oxygen contained in said enriched mixture to the anode thereof, and collecting the carbon dioxide remaining at the cathode of said second concentration cell.

5. The method of claim 4 in which said acid electrolyte is sulphuric acid.

6. The method of claim 4 in which said concentration cells are operated at temperatures on the order of 130° F.

7. The method of concentrating carbon dioxide from admixture with nitrogen and oxygen which comprises passing the gaseous mixture to a concentration cell having a porous cathode, a porous anode, and an aqueous alkali metal carbonate electrolyte therebetween, applying a potential between said cathode and anode less than the potential required to electrolyze said electrolyte, collecting a carbon dioxide enriched mixture at the anode of said cell, passing said carbon dioxide enriched mixture to the cathode of a second concentration cell having an acid electrolyte permitting passage of the oxygen contained in said enriched mixture to the anode thereof, collecting the carbon dioxide remaining at the cathode of said second concentration cell, removing moisture from the effluent from the anode of said second concentration cell, and returning the moisture so removed back to the first concentration cell.

References Cited

UNITED STATES PATENTS 2,726,930   12/1955   Edwards et al. ____ 204—103 X

FOREIGN PATENTS 303,027   10/1929   Great Britain.

JOHN H. MACK, *Primary Examiner.*

H. M. FLOURNOY, *Assistant Examiner.*